UNITED STATES PATENT OFFICE.

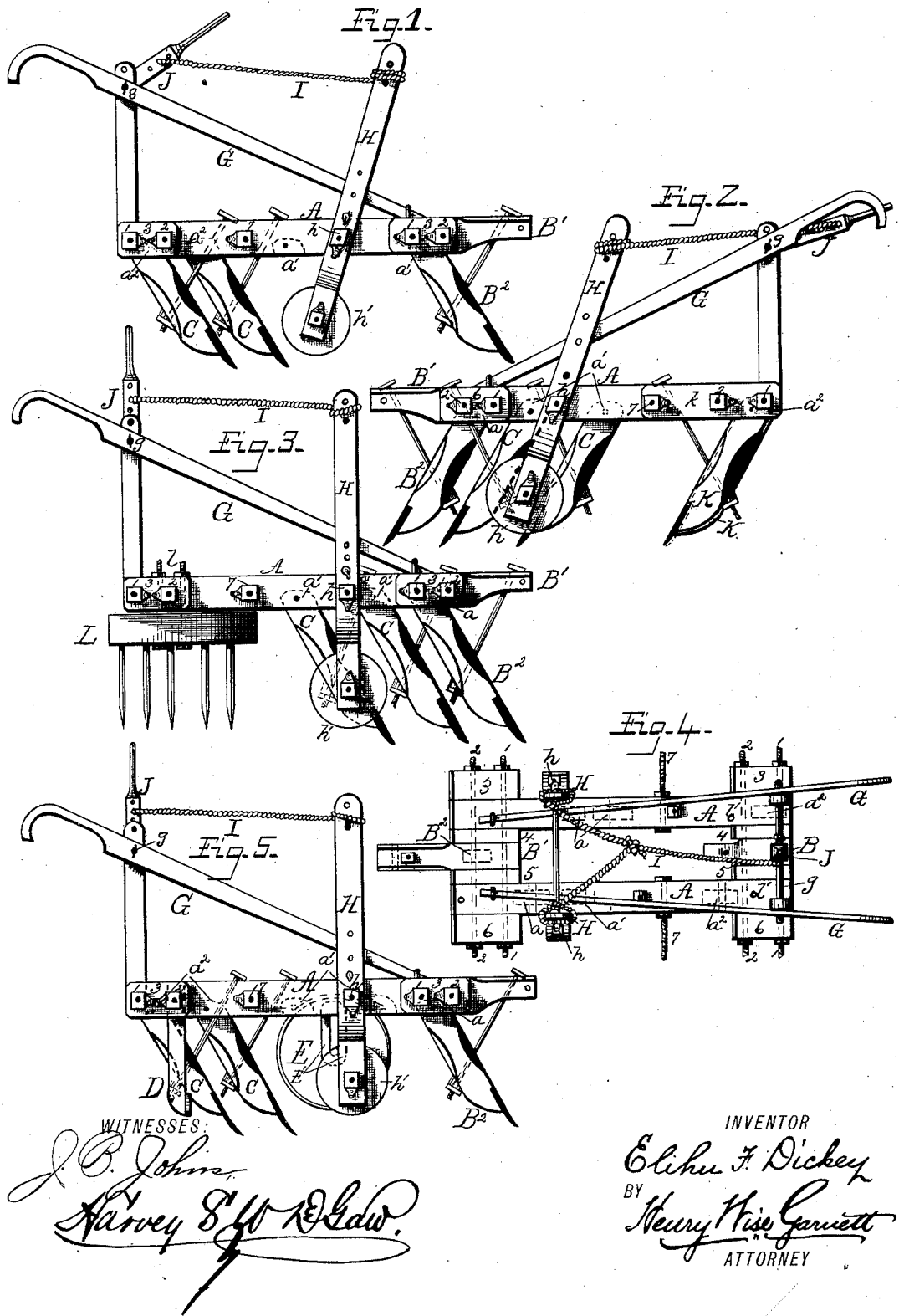

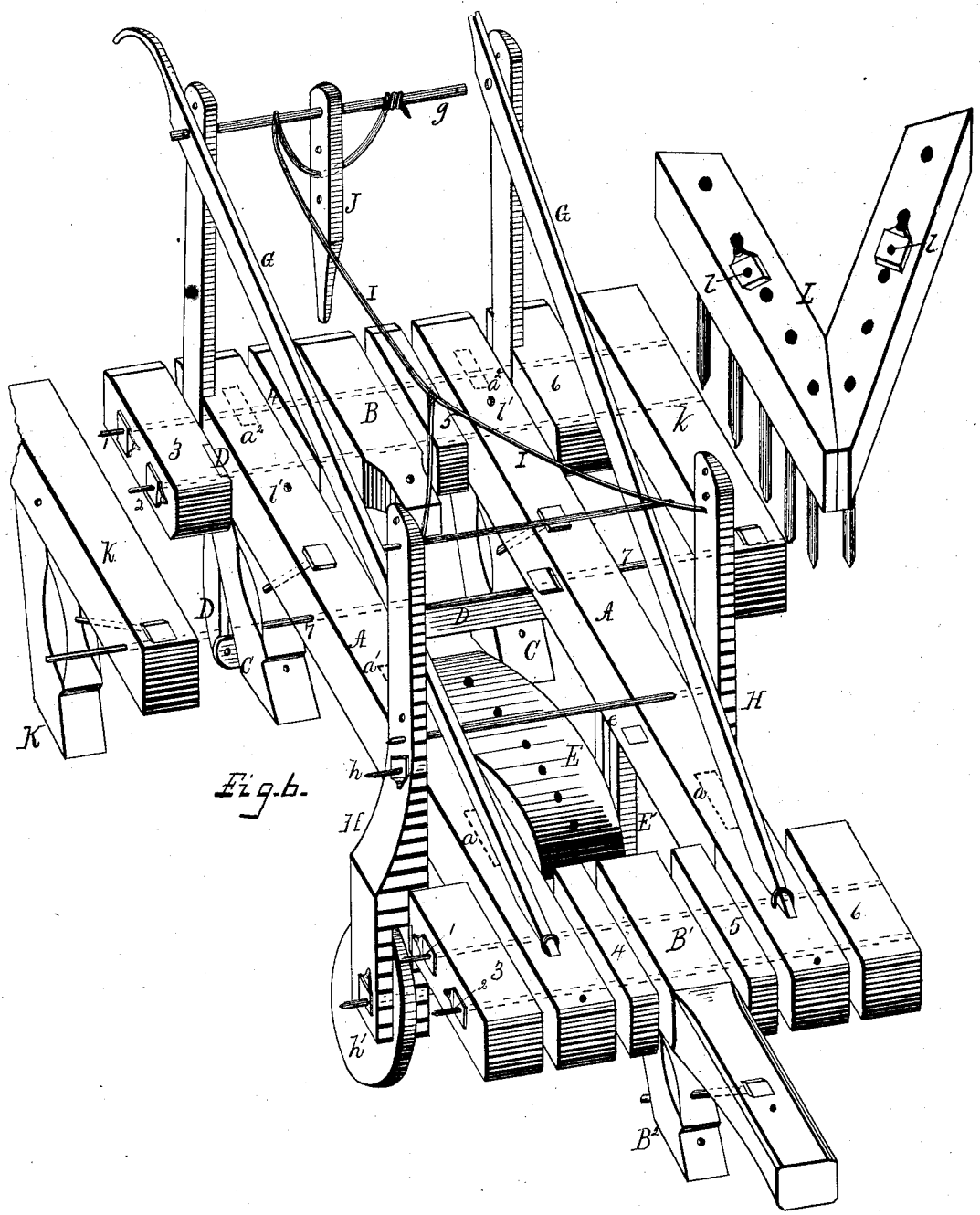

ELIHU F. DICKEY, OF NEAR EMMET, ARKANSAS.

COMBINED SEED-PLANTER AND CULTIVATOR.

SPECIFICATION forming part of Letters Patent No. 367,507, dated August 2, 1887.

Application filed March 1, 1887. Serial No. 229,279. (No model.)

*To all whom it may concern:*

Be it known that I, ELIHU F. DICKEY, a citizen of the United States, residing near Emmet, Nevada county, State of Arkansas, have invented certain new and useful Improvements in Combined Seed Planter and Cultivator; and I do hereby declare the following to be a full, clear, and exact description of the invention, such as will enable others skilled in the art to which it appertains to make and use the same.

My invention is an improvement in cultivators adapted for use as a seed-planter; and my said invention consists of a machine whose parts are made readily removable and interchangeable, whereby to convert the same into either a plow or cultivator of different forms, so that the operation of preparing the ground and cultivating the growing plants, as well as the primary planting of the seed, may be performed by the same machine.

The object of this invention is to supply farmers of limited means with a convenient and cheap implement whose parts are interchangeable, so that they may be readily replaced at slight cost, and to accomplish which I proceed as follows, reference now being had to the accompanying drawings for a better understanding of the details of construction and operation of my invention, and in which drawings—

Figure 1 represents a side elevation of a cultivator in which three shovels or points are employed; Fig. 2, a similar view in which five points are used; and Fig. 3, a similar view in which three points and a harrow-frame are used. Fig. 4 is a plan view. Fig. 5 is a view in elevation of a combined cultivator and seed-planter; and Fig. 6 is a perspective view of the same, the parts comprising said machine being shown as detached from each other, but in their relative positions as a combined machine.

The machine is preferably composed almost exclusively of wood and of any desired size or dimensions, of two side beams, A A, to which the several parts are attached, as will presently appear. These two longitudinal beams A A are secured together at their ends by two transverse bolts, 1 2 1 2, which bolts also pass through four removable blocks, 3 4 5 6, arranged upon each side of the ends of the beams A, whereby the proper distance apart of these beams may be preserved. At the center, between each of the ends of the beams A, is a short false beam, B and B', for the attachment of the clevis, by which the machine is drawn, and the one B' carries a standard, B², for a cultivator-blade. The blocks 3, 4, 5, and 6 are of different thicknesses, as shown, so that by putting the thin pieces 4 5 between the beams A the width of the frame is decreased, or its width increased by using the wide blocks 3 6 in place of the ones 4 5.

The beams A have angularly-placed sockets, as at $a$ $a'$ $a^2$, to receive the standards C, which are made removable and adapted to fit said sockets when it is desired to change the position of said standards for different classes of work, as shown in Figs. 1 and 2, and a vertical bolt-hole, $l'$, is also provided for the purposes, as will presently appear.

G G are the handles by which the machine is manipulated, and H H is a frame pivoted at the front of the beams A by a cross-bolt, $h$, and bearing at their lower ends rollers $h'$. From the top of this standard H extends a cord, I, which passes back to the bar $g$ of the handles G, to which it is attached after passing through a lever, J, swung upon said bar $g$; or the cord may be attached directly to the lever J. The object of this lever J and cord I is to operate the standards H—that is to say, by drawing upon said rope I to cause the standards H to assume a more or less vertical position and by bringing the rollers $h'$ against the ground, thereby cause the elevation of the machine from the ground and bring its cultivator-teeth more or less out of operation.

K K represent additional plow-standards for carrying cultivator or plow points secured to a short beam, $k$, which are adapted for use at the sides of the bars A, to which they are secured by the two end bolts, 1 2, which pass through the rear end of said frame and short beam $k$, and a short bolt, 7, which also passes through the front end of the beam $k$ and frame A, as shown in Figs. 2 and 6.

As before stated, the width of the machine may be increased or decreased by using either the thick or thin blocks 3 4 or 5 6, and the false beam B', with its attached cultivator-standard B², may be removed from the front and placed at the rear of the machine, and the piece B, which bears no cultivator-standard, placed in front; or by arranging the standards C C at the front of the machine, to occupy the slots *a* therein, and the standards K K at the sides of the beams A upon the bolts 1, 2, and 7, as shown in Fig. 2, a cultivator is produced having five teeth or points; and by arranging different forms of points on these standards the earth can be thrown to or from the plants, or bedded or laid by, just as desired; or instead of five points three may be used, as in Fig. 1, one in front and two at the rear, or either three or five cultivator-teeth may be used, in connection with the harrow-frame L, at the rear, as shown in Fig. 3. This harrow-frame may be V-shaped and supplied with two vertically-placed bolts, *l*, which pass through the holes *l'* of the frame A, and thereby secure said harrow beneath the rear end of said frame.

As before stated, various forms of plow-points or cultivator-teeth may be employed upon the standards, and said standards may be arranged in different positions upon the frame to accomplish the desired result either in plowing new land, bedding, rebedding, cultivating, &c., and by means of the roller-supports H the depth of plowing and cultivating may be regulated as desired.

To adapt the machine for use as a seed-planter, a seed-cylinder, E, may be suspended between the beams A, within slotted guideways E', depending from said beams A, as shown in Figs. 5 and 6, in which instance either the two plow standards C C may be employed at the rear of the frame to cover the seed, or simply a covering-board, D, as shown in Figs. 5 and 6. If desired, this seed-cylinder may remain upon the machine when the same is in use as a cultivator, in which connection, it being journaled in slotted guideways, a free vertical movement is permitted thereto, so that injury will not result to said cylinder, but, on the other hand, it will act as a roller and assist in breaking up the land.

Having thus described my invention, what I claim as new therein, and desire to secure by Letters Patent of the United States, is as follows, to wit:

1. The frame composed of the two longitudinal bars A A, blocks 3 4 5 6, bolts 1 2 1 2, and false beams B B', made removable and interchangeable, combined with suitable handles and plow-standards, as described, for the purposes specified.

2. In combination with the frame A, having slots *a a'* therein, blocks 3 4, bolts 1 2, and false beams B B', with plow-standard B², made removable and interchangeable, the removable plow-standards C C, adapted to fit in the slots *a a' a²* of the frame, as described, for the purposes specified.

3. In combination with the frame A, having slots *a a'* therein, and removable plow-standards C C, the standards K K, combined with the bolts 1 2 at the rear of the frame, and bolts 7, as described, for the purposes specified.

ELIHU F. DICKEY.

In presence of—
H. STAINTON,
R. F. ELGIN.